(12) United States Patent
Nakamura et al.

(10) Patent No.: US 7,416,805 B2
(45) Date of Patent: Aug. 26, 2008

(54) FUEL CELL DEVICE AND CASE THEREOF

(75) Inventors: Akio Nakamura, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 599 days.

(21) Appl. No.: 10/677,353

(22) Filed: Oct. 3, 2003

(65) Prior Publication Data

US 2004/0166391 A1 Aug. 26, 2004

(30) Foreign Application Priority Data

Feb. 24, 2003 (JP) .............................. 2003-045969

(51) Int. Cl.
  *H01M 2/00* (2006.01)
  *H01M 2/14* (2006.01)
  *H01M 8/00* (2006.01)

(52) U.S. Cl. .............................. 429/34; 429/38; 429/12

(58) Field of Classification Search .................. 429/34, 429/38, 12
See application file for complete search history.

(56) References Cited

U.S. PATENT DOCUMENTS 6,872,483 B2 * 3/2005 Sugiura et al. ................ 429/26

FOREIGN PATENT DOCUMENTS

| DE | 4033708 A1 * | 5/1991 |
| JP | 07035883 A * | 2/1995 |
| JP | 9-115539 | 5/1997 |

* cited by examiner

*Primary Examiner*—Patrick Ryan
*Assistant Examiner*—Angela Martin
(74) *Attorney, Agent, or Firm*—Staas & Halsey LLP

(57) ABSTRACT

A fuel cell device is disclosed that is capable of being made compact when being transported and in storage. The fuel cell device includes a fuel cell unit including a number of fuel cells arranged sequentially in a case. The case includes a holder frame for holding the fuel cells, a first hemi-case, and a second hemi-case. The width of the case is adjustable in the direction in which the fuel cells are arranged in a line. When the fuel cell device is being transported or in storage, the first hemi-case and the second hemi-case are pushed to approach each other, making the size of the case small. When the fuel cell device is used to generate electrical power, the first hemi-case and the second hemi-case are pulled apart from each other and, accordingly, the fuel cells are separated from each other by a springy plate.

5 Claims, 14 Drawing Sheets

IN USE

NOT IN USE

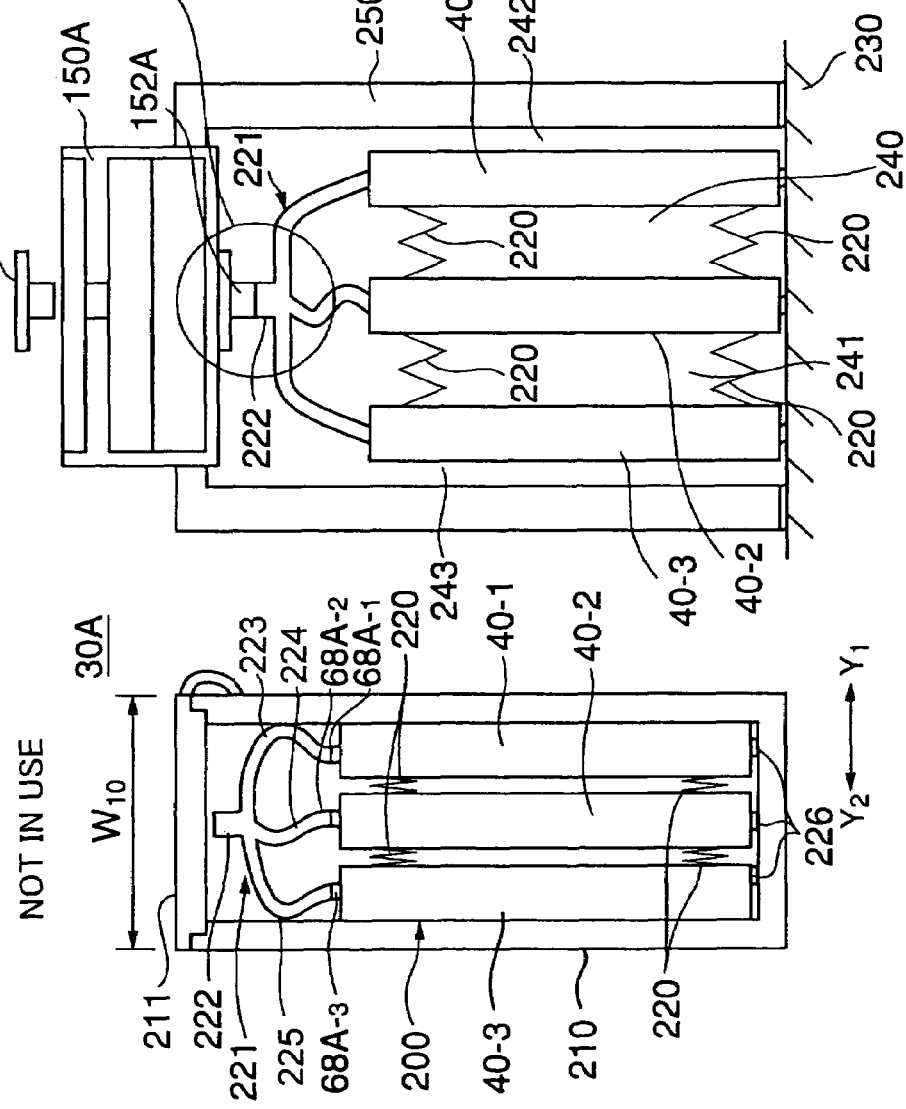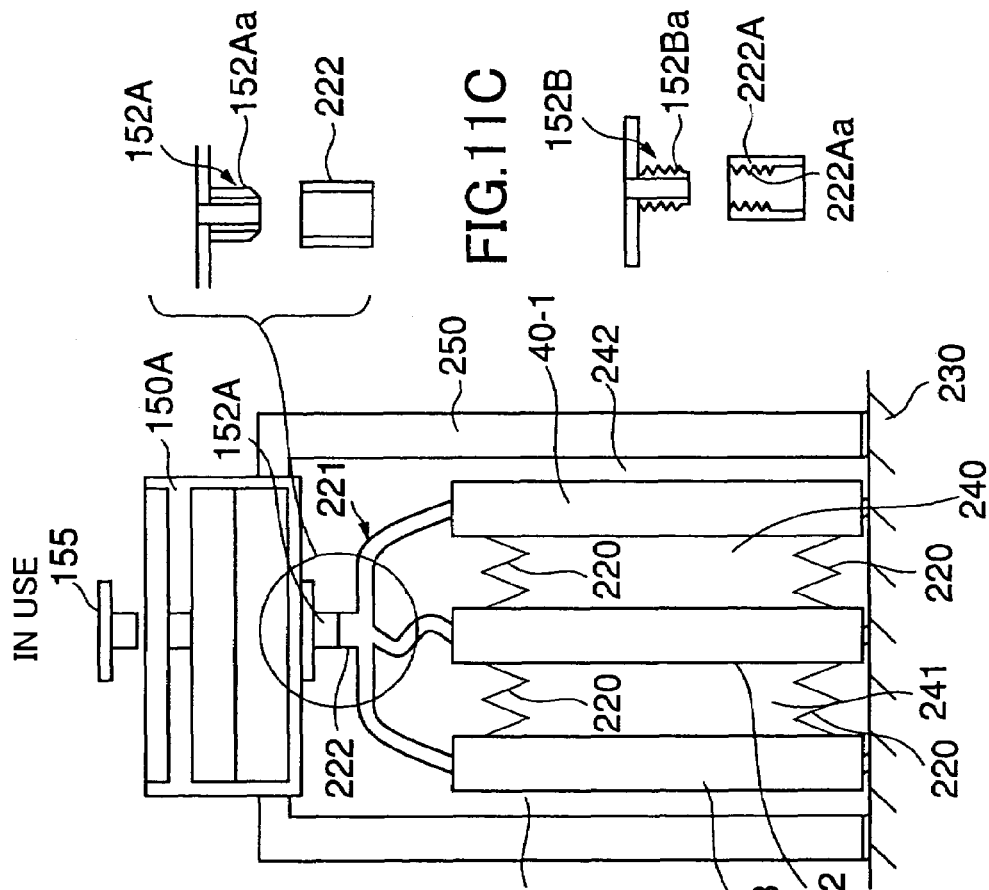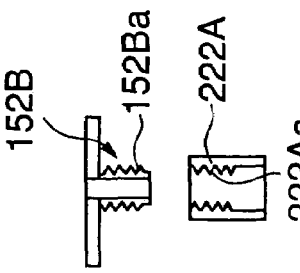

FUEL CELL DEVICE AND CASE THEREOF

BACKGROUND OF THE INVENTION

1. Field of the Invention

The present invention relates to a fuel cell device and a case thereof, more specifically, to a fuel cell device for charging the battery of a cellular phone and a case thereof.

2. Description of the Related Art

A fuel cell device, which generates electrical power by filling liquid fuel, for example, is useful for charging the battery of a cellular phone in case of emergency and commercial batteries are not available. In order for a fuel cell device to yield a sufficiently high output, usually two or three fuel cells are connected in series and are accommodated in a case. Furthermore, in practical use, a person places a number of fuel cell devices into a bag for transportation, so it is desirable that the fuel cell device be compact.

FIG. 1 is a view of a fuel cell device 10 of the related art. The fuel cell device 10 has two fuel cells 12 and 13 accommodated in a case 11. The two fuel cells 12 and 13 are separated at a distance by a spacer 14. In FIG. 1, this distance is indicated by the letter "a", and the reference number 15 represents the space between the fuel cells 12 and 13. There is also space 16 of a width b between the fuel cell 12 and the case 11, and space 17 of a width c between the fuel cell 13 and the case 11. The spaces 15, 16, and 17 are necessary for feeding air into the fuel cells 12 and 13 for the fuel cells 12 and 13 to generate electrical power. In FIG. 1, the reference numbers 18 and 19 represent a fuel feeding port and a pipe, respectively.

For the fuel cells 12 and 13 to generate electrical power, a liquid fuel, such as methanol, is filled into the fuel cells 12 and 13 through the fuel feeding port 18 and the pipe 19. Then the fuel cells 12 and 13 start to generate electrical power with the liquid fuel.

In the above configuration, however, because of the existence of the spaces 15, 16, and 17 inside the case 11, the width of the fuel cell device 10 is large, and it is not easy to make the case 11 compact.

SUMMARY OF THE INVENTION

Accordingly, it is an object of the present invention to solve one or more of the problems of the related art and to provide a fuel cell device capable of being made compact when being transported and in storage, for example.

According to a first aspect of the present invention, there is provided a fuel cell device, including a plurality of fuel cells, and a case in which the fuel cells are arranged in order along a predetermined direction, a length of the case along the predetermined direction being changeable, wherein an interval between adjacent two of the fuel cells decreases when the length of the case along the predetermined direction decreases, and the interval between adjacent two of the fuel cells when the length of the case increases along the predetermined direction increases.

According to the present invention, the width of the case may be expanded or contracted, and the interval between two adjacent fuel cells may be accordingly enlarged or reduced. Therefore, when the fuel cell device is being transported or is in storage, for example, the adjacent fuel cells may be brought in close proximity to each other by reducing the size of the case, and this makes the fuel cell device compact. Meanwhile, when electrical power generation is to be performed, the interval between two adjacent fuel cells may be increased by enlarging the size of the case, and resultantly a sufficient amount of air can be supplied to the fuel cells, and this enables efficient power generation.

Because the interval between two adjacent fuel cells may be enlarged or reduced in conjunction with changes of the width of the case, it is sufficient to just change the size of the case in order to change the interval between fuel cells, and it is not necessary to operate the fuel cells themselves directly, so the operation is very simple.

According to a second aspect of the present invention, there is provided a fuel cell device, comprising a case including a holder frame, a first hemi-case movably attached to a first side of the holder frame, and a second hemi-case movably attached to a second side of the holder frame opposite to the first side, the first hemi-case and the second hemi-case being movable in an approaching direction in which the first hemi-case and the second hemi-case approach and a separating direction in which the first hemi-case and the second hemi-case separate, a fuel cell unit in the case, including a plurality of fuel cells movably arranged inside the holder frame, and a springy member that urges adjacent two of the fuel cells to enlarge an interval therebetween, wherein when the first hemi-case and the second hemi-case are moved in the separating direction, adjacent two of the fuel cells are moved by the springy member, thereby enlarging an interval between adjacent two of the fuel cells.

According to the present invention, the width of the case may be expanded or contracted, and the interval between adjacent two fuel cells may be accordingly enlarged or reduced. Therefore, when the fuel cell device is being transported or is in storage, for example, the adjacent fuel cells may be brought in close proximity to each other by reducing the size of the case, and this makes the fuel cell device compact.

The case is formed from a holder and two hemi-cases movably attached to two opposite sides of the holder. This configuration makes the case a stable structure and the size of the case changeable. Because the fuel cells are accommodated inside the holder, even when the interval between fuel cells is enlarged, the fuel cells are stably held by the holder. Because two adjacent fuel cells can be separated by a springy member between two neighboring fuel cells, it is possible to realize, by a very simple structure, that interval between two neighboring fuel cells can be changed in conjunction with compression and expansion of the springy member.

When the interval between two adjacent fuel cells is increased by enlarging the size of the case, a space is formed between two adjacent fuel cells and the case, and a sufficient amount of air is supplied into the fuel cell device, and this enables efficient power generation.

Preferably, the holder frame has a first opening that makes space between adjacent two of the fuel cells communicate with space outside the case, each of the first hemi-case and the second hemi-case has a second opening that makes space between the case and the fuel cell adjacent to the case communicate with space outside the case, and the first opening and the second opening are sealed by the first hemi-case and the second hemi-case when the first hemi-case and the second hemi-case are moved to confront with each other, and are exposed when the first hemi-case and the second hemi-case are moved to separate from each other.

According to the present invention, the opening on the holder and the openings on the hemi-cases are sealed by the first hemi-case and the second hemi-case when the first hemi-case and the second hemi-case are moved to confront with each other. Therefore it is possible to prevent dust from entering the fuel cell device. On the other hand, the opening in the holder and the openings in the hemi-cases may be exposed when the first hemi-case and the second hemi-case are moved to separate from each other. As a result, a sufficient amount of air from the outside of the case can be supplied into the fuel cells, and this enables efficient power generation.

Preferably, the holder frame includes a fuel feeding port, and the fuel cell unit includes a flexible tube for connecting the fuel cells and the fuel feeding port.

According to the present invention, a flexible tube may be used to connect the fuel cells and the fuel feeding port on the holder. Because the tube is flexible and can be freely bent, adjacent two fuel cells have no difficulties in moving away from each other, and thus the interval between adjacent two fuel cells can be surely enlarged. Furthermore, because the fuel feeding port is formed on the holder and is not movable, it facilitates usage of a fuel cartridge for feeding a fuel through the fuel feeding port.

According to a third aspect of the present invention, there is provided a fuel cell device, comprising a case, a fuel cell unit able to be accommodated in and be taken out of the case, the fuel cell unit including a plurality of fuel cells, and a springy member that urges to separate adjacent two of the fuel cells, wherein when the fuel cell unit is accommodated in the case, the fuel cells are brought in proximity to each other and the springy member is compressed, and when the fuel cell unit is taken out of the case, adjacent two of the fuel cells are separated from each other by the springy member.

According to the above aspect of the present invention, an interval between adjacent two fuel cells may be enlarged or reduced. Therefore, when the fuel cell device is being transported or is in storage, the adjacent fuel cells may be brought in close proximity to each other by accommodating the fuel cells into the case, and this makes the fuel cell device compact. Meanwhile, when electrical power generation is to be performed, the interval between two adjacent fuel cells may be increased by taking out the fuel cell unit out of the case, and resultantly a sufficient amount of air can be supplied to the fuel cells, and this enables efficient power generation.

Because the interval between adjacent two fuel cells is enlarged when the fuel cell unit is taken out of the case, it is sufficient to just take the fuel cell unit out of the case in order to increase the interval between fuel cells, and it is not necessary to operate the fuel cells themselves directly, so the operation is very simple.

Preferably, the fuel cell unit includes a hinge joining the fuel cells, and the springy member is attached to the hinge.

Accordingly, because the adjacent fuel cells are joined by a hinge, the structure of the fuel cell unit is stable even though the interval between neighboring fuel cells is enlarged.

According to a fourth aspect of the present invention, there is provided a liquid fuel cartridge for feeding a liquid fuel into a fuel cell device including a case and a fuel cell unit in the case, the liquid fuel cartridge comprising a tank that stores an amount of liquid fuel, the tank having an opening in a top side thereof, a nozzle provided at a bottom side of the tank, and a cap for closing the opening, wherein the liquid fuel cartridge is attached to the fuel cell device by inserting the nozzle into the fuel cell device, and the liquid fuel is fed into the fuel cell device by removing the cap from the opening, whereby the liquid fuel communicates with air.

According to the present invention, feeding a liquid fuel into fuel cells in a fuel cell device may be surely performed by just inserting the nozzles into the fuel cell device and removing the cap of the fuel cartridge.

According to a fifth aspect of the present invention, there is provided a fuel cell case for accommodating a plurality of fuel cells, comprising a case in which the fuel cells are arranged in order along a predetermined direction, a length of the case along the predetermined direction being changeable, wherein an interval between adjacent two of the fuel cells decreases when the length of the case along the predetermined direction decreases, and the interval between adjacent two of the fuel cells increases when the length of the case along the predetermined direction increases.

According to a sixth aspect of the present invention, there is provided a fuel cell case for accommodating a plurality of fuel cells, comprising a holder frame, a first hemi-case movably attached to a first side of the holder frame, and a second hemi-case movably attached to a second side of the holder frame opposite to the first side, the first hemi-case and the second hemi-case being movable in an approaching direction in which the first hemi-case and the second hemi-case approach and a separating direction in which the first hemi-case and the second hemi-case separate, wherein when the first hemi-case and the second hemi-case are moved in the separating direction, an interval between adjacent two of the fuel cells is enlarged.

These and other objects, features, and advantages of the present invention will become more apparent from the following detailed description of the preferred embodiments given with reference to the accompanying drawings.

BRIEF DESCRIPTION OF THE DRAWINGS

FIGS. 11A, 11B and 11C are views of a fuel cell device according to a second embodiment of the present invention;

DESCRIPTION OF THE PREFERRED EMBODIMENTS

Below, preferred embodiments of the present invention will be explained with reference to the accompanying drawings.

First Embodiment

First, explanations of a configuration of the fuel cell device 30 according to a first embodiment of the present invention are made below with reference to FIG. 2 through FIG. 8.

Figure 2:
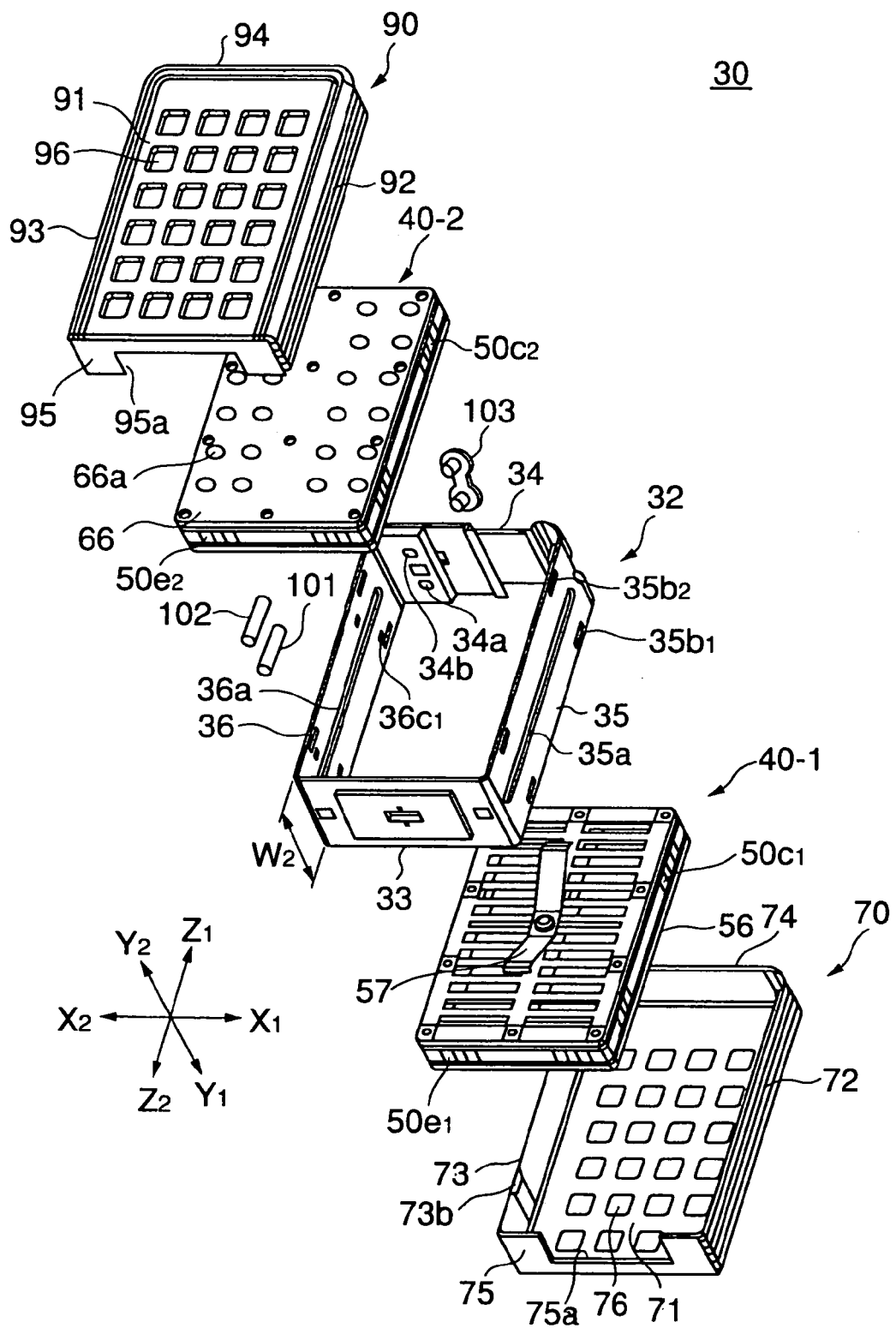
FIG. 2 is an exploded perspective view of a fuel cell device according to a first embodiment of the present invention.
Figure 3B:
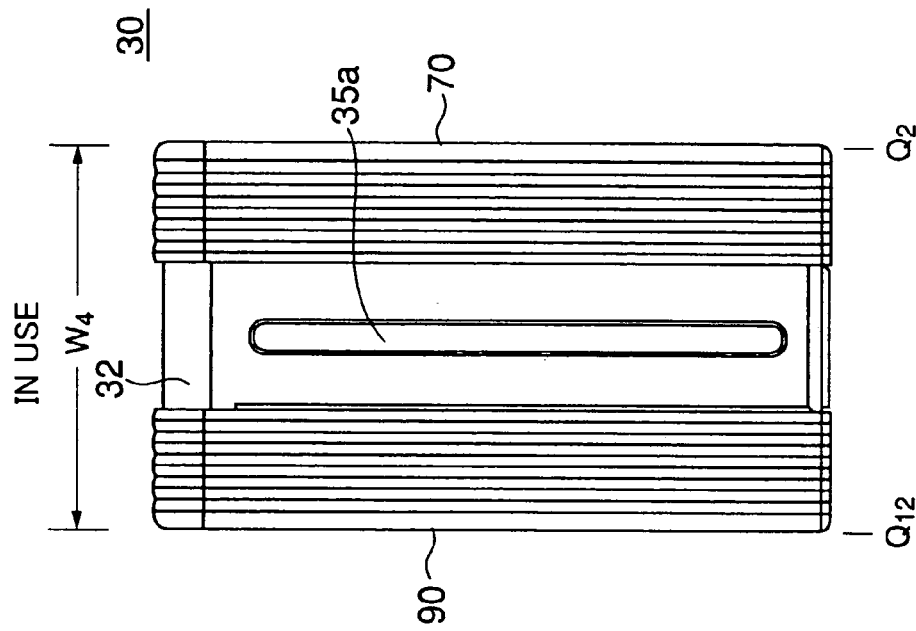
FIGS. 3A and 3B are front views of the fuel cell device in FIG. 2, showing a "not in use" state and an "in use" state of the fuel cell device 30, respectively.
Figure 3A:
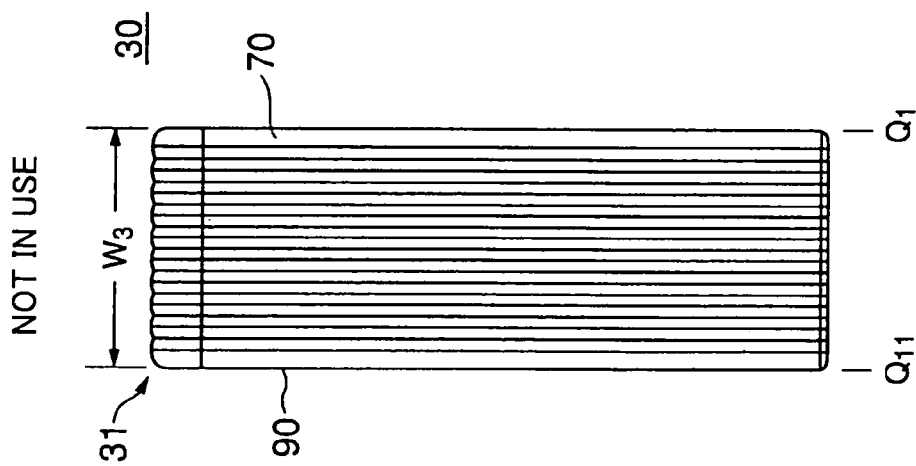
Figure 4:
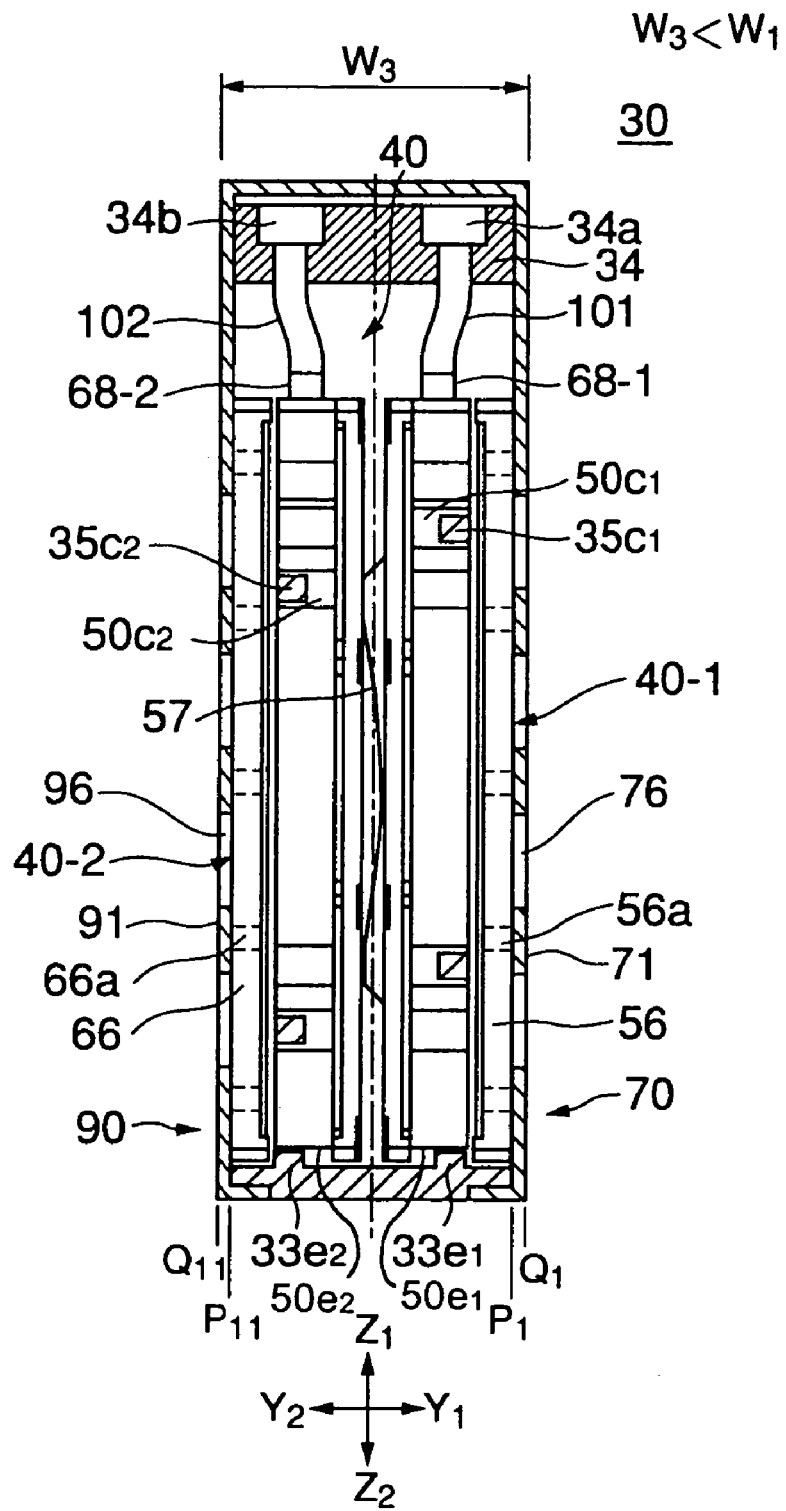
FIG. 4 is a sectional front view of the fuel cell device in FIG. 2 when it is not in use.
Figure 5:
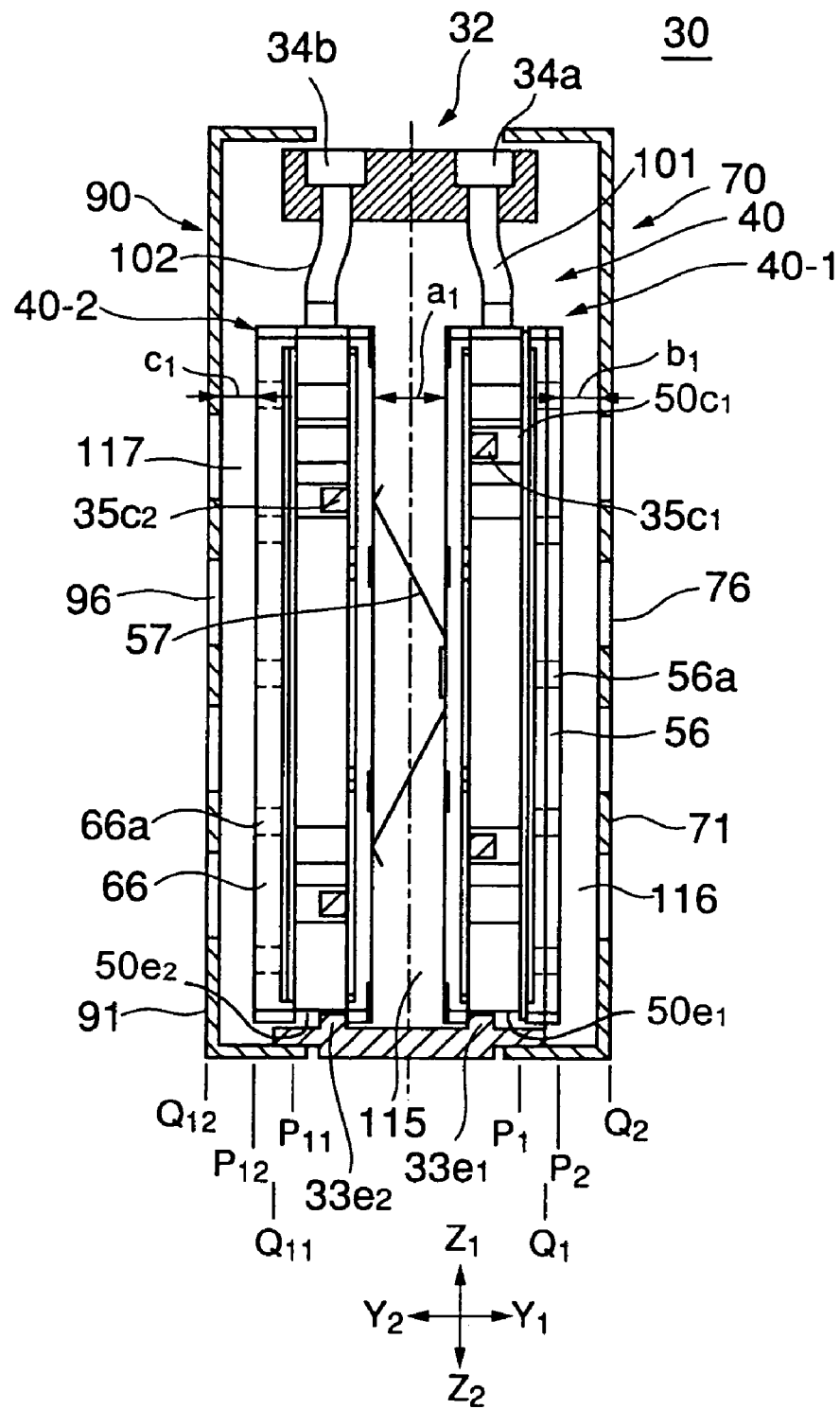
FIG. 5 is a sectional front view of the fuel cell device in FIG. 2 when it is in use.
Figure 6B:
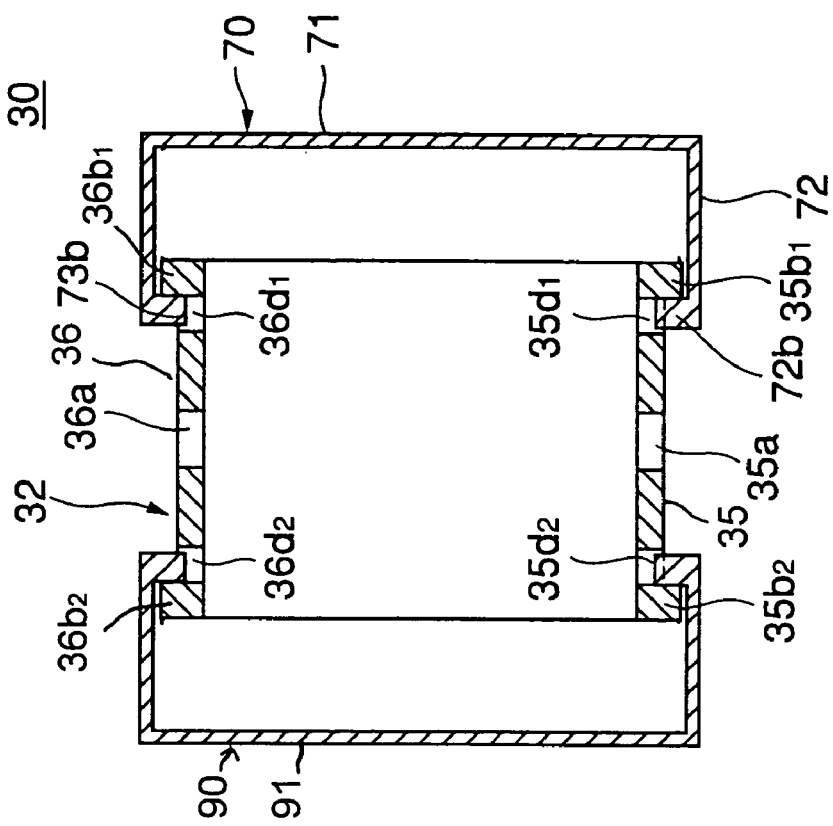
FIGS. 6A and 6B are sectional top views of the fuel cell device in FIG. 2.
Figure 6A:
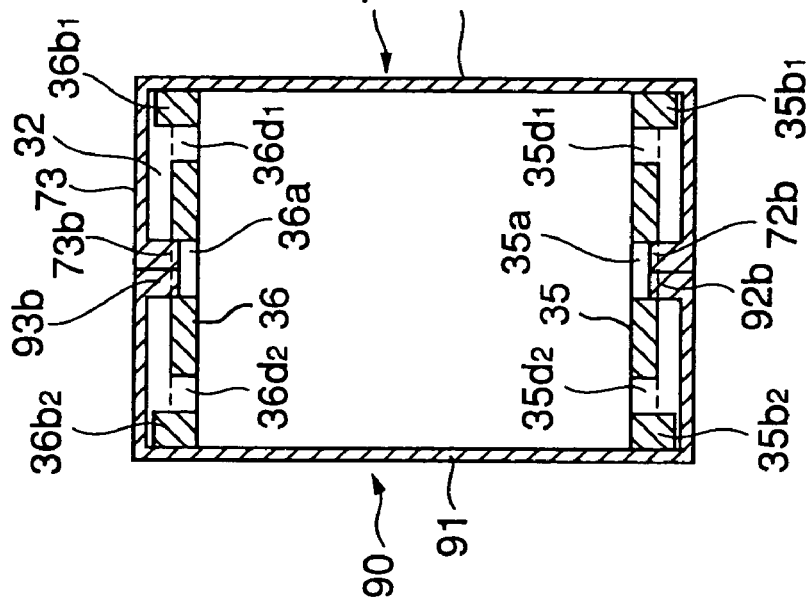

FIG. 2 is an exploded perspective view of a fuel cell device 30 according to the present embodiment; FIGS. 3A and 3B are front views of the fuel cell device 30; FIG. 4 and FIG. 5 are sectional front views of the fuel cell device 30; FIGS. 6A and 6B are sectional top views of the fuel cell device 30.

In detail, FIG. 3A, FIG. 4, and FIG. 6A show a state of the fuel cell device 30 when it is not in use, for example, the fuel cell device 30 is being transported or in storage. FIG. 3B, FIG. 5, and FIG. 6B show a state of the fuel cell device 30 when it is being used for electrical power generation.

In the following description with reference to the above figures, the X1-X2 direction is along the depth direction of the fuel cell device 30, the Y1-Y2 direction is along the width direction, and the Z1-Z2 direction is along the height direction of the fuel cell device 30, respectively. Here, a number of fuel cells are placed in a line along the Y1-Y2 direction in the fuel cell device 30.

Referring to FIG. 2 through FIG. 6A and FIG. 6B, the fuel cell device 30 includes a fuel cell unit 40, which is constituted by two fuel cells 40-1 and 40-2 and accommodated in a case 31 including a fuel cell holder 32, a first hemi-case 70, and a second hemi-case 90. Each of the fuel cells 40-1 and 40-2 is in the shape of a square-plate. The fuel cell device 30 generates electrical power when, for example, methanol is introduced therein. The fuel cell holder 32 is in the shape of a frame. The size of the case 31 is adjustable in the Y1-Y2 direction, in which the fuel cells 40-1 and 40-2 are placed in a line.

Each of the fuel cells 40-1 and 40-2 is engaged with the fuel cell holder 32 at two places on each side of the frame of the fuel cell holder 32. The first hemi-case 70 and the second hemi-case 90 are also engaged with the fuel cell holder 32 at two places on each side of the frame of the fuel cell holder 32. For illustration purposes, the engagement at one place is explained below.

Figure 8:
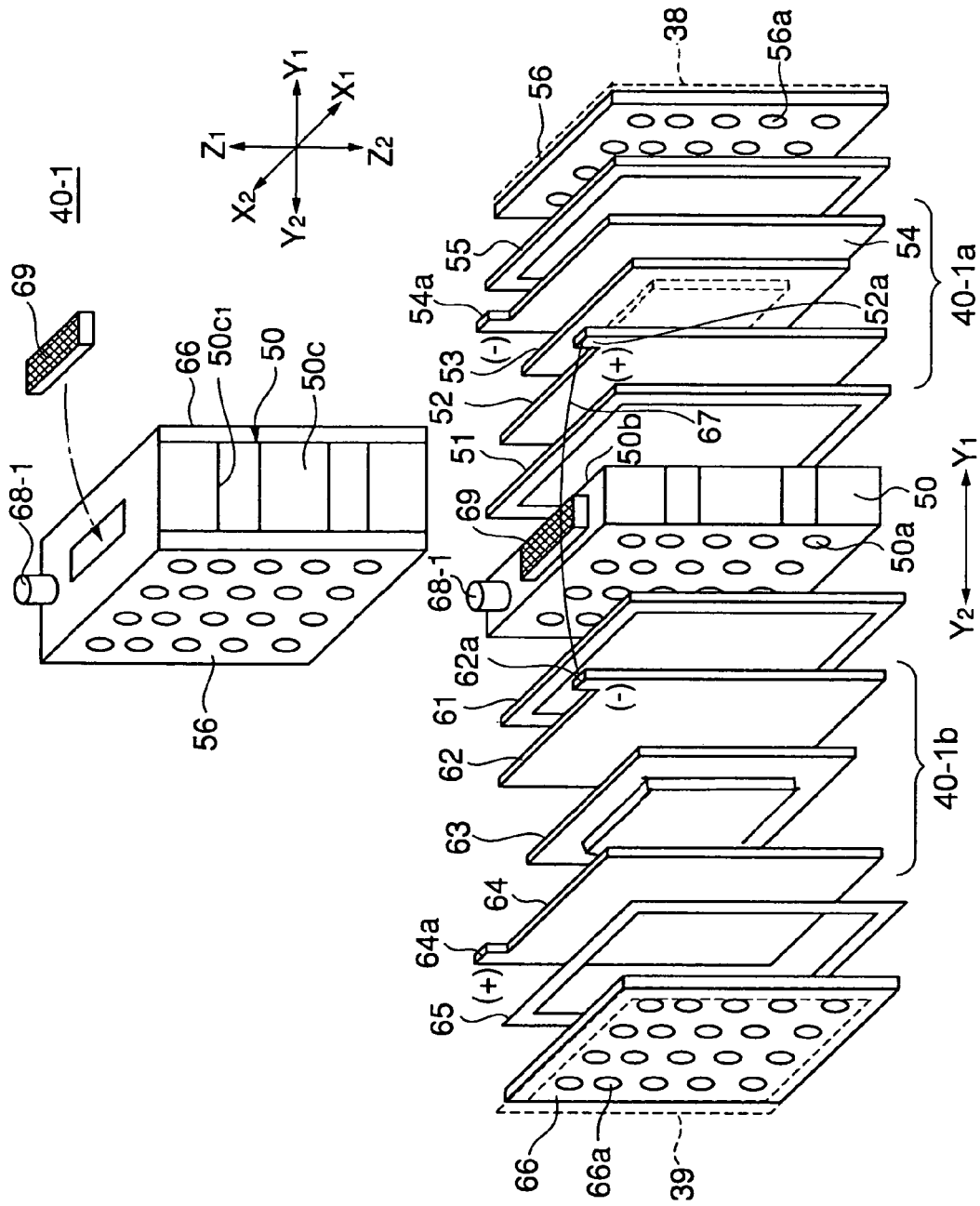
FIG. 8 is an exploded perspective view of a fuel cell.

First, the fuel cell 40-1 is explained while referring to FIG. 8.

FIG. 8 is an exploded perspective view of the fuel cell 40-1 expanded in the Y1-Y2 direction.

In the fuel cell 40-1, core portions 40-1a and 40-1b of the fuel cell 40-1 are placed on the two sides of a fuel housing 50, respectively. The fuel housing 50 is like a tank, and has holes 50a in its side surfaces. With the fuel housing 50 at the center, on the Y1 side, there is a stacked structure comprising a sealing rubber rim 51, an electricity collector 52 including a positive electrode 52a, a membrane-electrode assembly (MEA) 53, an electricity collector 54 including a negative electrode 54a, a sealing rubber rim 55, and an air housing 56 having air holes 56a. Meanwhile, on the Y2 side of the fuel housing 50, there is a stacked structure comprising a sealing rubber rim 61, an electricity collector 62 including a negative electrode 62a, a membrane-electrode assembly 63, an electricity collector 64 including a positive electrode 64a, a sealing rubber rim 65, and an air housing 66 having air holes 66a. The positive electrode 52a and the negative electrode 62a are connected by a cord 67. On the top side 50b of the fuel housing 50, that is, on the Z1 side surface of the fuel housing 50, there is a fuel feeding port 68-1 and a filter 69 exchangeably attached to the fuel housing 50. Moreover, the filter 69 has characteristics of allowing gas (for example, $CO_2$) but refusing liquid to pass through.

Figure 7:
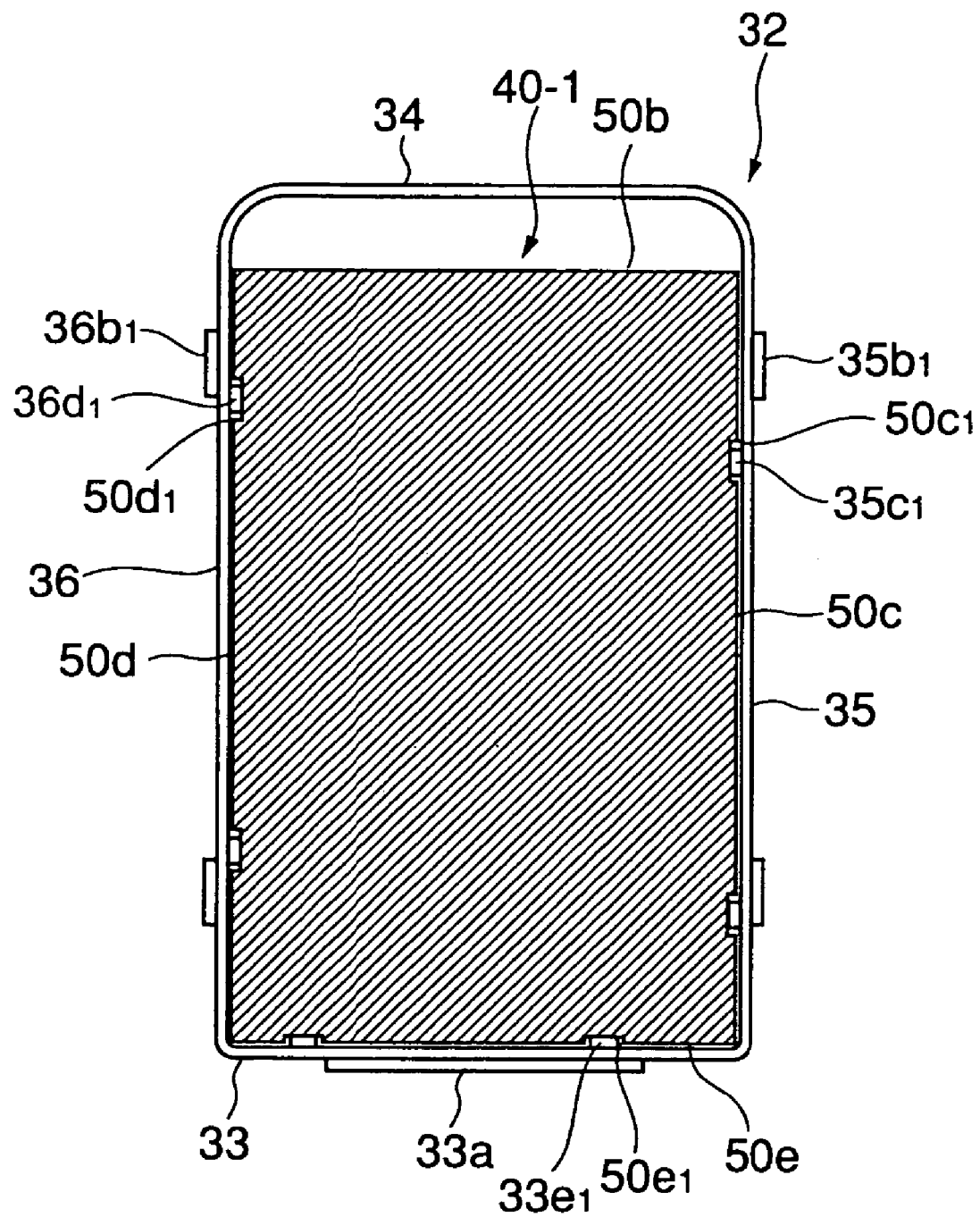
FIG. 7 is a side view of the holder for supporting the fuel cell device in FIG. 2, viewed from the Y2 direction in FIG. 2.

Also referring to FIG. 7, guiding grooves 50c1 are formed on the side surface 50c of the fuel housing 50, that is, on the X1 side surface of the fuel housing 50. Guiding grooves 50d1 are formed on surface 50d on the X2 side, and guiding grooves 50e1 are formed on surface 50e on the Z2 side.

The fuel cell 40-2 has basically the same structure as the fuel cell 40-1. The fuel cell 40-1 and the fuel cell 40-2 are connected by a cord 67, and the four fuel cell core portions 40-1a, 40-1b of the fuel cell 40-1 and 40-2a and 40-2b (not illustrated) of the fuel cell 40-2 are connected in series.

Also referring to FIG. 4 and FIG. 5, a springy member 57, such as the illustrated V-shaped plate 57, is attached to the air housing 66 of the fuel cell 40-1. For example, the springy member 57 is screwed to the air housing 66 at the valley the V-shaped plate.

Returning to FIG. 8, a square frame shock absorber 38, as indicated by the dashed line in FIG. 8, is attached to the outer side of the air housing 56. Similarly, a shock absorber 39 is attached to the outer side of the air housing 66. These shock absorbers 38 and 39 improve the shock tolerance of the fuel cell 40-1, for example, when the fuel cell 40-1 topples over.

As shown in FIG. 2, the holder 32 is a square frame, including a bottom plate 33, a top plate 34, a front plate 35 and a back plate 36. The size (W2) of the holder 32 in the Y1-Y2 direction is approximately equal to the total thickness of the fuel cells 40-1 and 40-2. As will be appreciated, the holder 32 is able to accommodate the fuel cells 40-1 and 40-2 when the fuel cells 40-1 and 40-2 are superposed.

Also referring to FIGS. 6A and 6B, slits 35a and 36a for bringing air in are formed in the front plate 35 and the back plate 36, respectively, at the centers of the plates 35 and 36 in the Y1-Y2 direction and extending in the Z1-Z2 direction. In addition, openings 35d1, 35d2, and 36d1, 36d2 are formed in the front plate 35 and the back plate 36, respectively.

FIG. 7 is a side view of the holder 32 viewed from the Y2 direction.

Referring to FIG. 7, and FIGS. 6A and 6B as well, on the inner sides of the front plate 35 and back plate 36 of the holder 32, guiding projections 35c1 and 36c1 are formed, and on the outer sides of the front plate 35 and back plate 36, stopper projections 35b1, 35b2, 36b1 and 36b2 are formed. On the X2 side of the top plate 34, that is, on the left side of the top plate 34 in FIG. 2, two fuel feeding holes 34a and 34b are formed in a line along the Y1-Y2 direction. On the Z2 side of the bottom plate 33, that is, on the lower side of the bottom plate 33 in FIG. 2, there is formed a square projection 33a at the center of the bottom plate 33. On the Z1 side of the bottom plate 33, that is, on the upper side of the bottom plate 33 in FIG. 2, there are formed guiding projections 33e1 and 33e2 (also refer to FIG. 4 and FIG. 5).

Also referring to FIG. 6, the first hemi-case 70 is like half of a box, having such a width that half of the holder 32 on the Y1 side can be enclosed. The first hemi-case 70 includes a grid plate 71, a front plate 72 on the X1 side, a back plate 73 on the X2 side, a top plate 74 on the Z1 side, and a bottom plate 75 on the Z2 side. On the grid plate 71, there are square holes 76 arranged in a matrix manner for bringing air in. On the inner side of the front plate 72, there is a latch 72b, and on the inner side of the back plate 73, there is formed a latch 73b. On the bottom plate 75, there is formed a cutting area 75a corresponding to the projection 33a on the lower side of the bottom plate 33 of the holder 32.

The second hemi-case 90, basically the same as the hemi-case 70, is like half of a box, having such a width that half of the holder 32 on the Y2 side can be enclosed. The second hemi-case 90 includes a grid plate 91, a front plate 92 on the X1 side, a back plate 93 on the X2 side, a top plate 94 on the Z1 side, and a bottom plate 95 on the Z2 side. On the grid plate 91, there are square holes 96 arranged in a matrix manner for bringing air in. On the front plate 92 and the back plate 93, latches 92b and 93b are formed, and on the bottom plate 95, a cutting area 95a is formed corresponding to the projection 33a on the back side of the bottom plate 33.

As illustrated in FIG. 4 and FIG. 5, the fuel cell 40-1 is attached in the holder 32 on the Y1 side, and the fuel cell 40-2 is attached in the holder 32 on the Y2 side. When the first hemi-case 70 is mounted, it encloses half of the holder 32 on the Y1 side, and when the second hemi-case 90 is mounted, it encloses half of the holder 32 on the Y2 side. In this state, the square holes 76 in the first hemi-case 70 deviate from the air holes 56a in the air housing 56 of the fuel cell 40-1, and the square holes 96 in the second hemi-case 90 deviate from the air holes 66a in the air housing 66 of the fuel cell 40-2.

Below, an explanation is made of the mounting relation between the fuel cells 40-1 and 40-2 and the holder 32.

As illustrated in FIG. 4, FIG. 5, and FIG. 7, the fuel cell 40-1 is attached on the bottom plate 33 of the holder 32. The guiding projections 33e1 are accommodated in the guiding grooves 50e1, the guiding projections 35c1 are accommodated in the guiding grooves 50c1, and the guiding projections 36d1 are accommodated in the guiding grooves 50d1. Therefore, within the widths of the grooves 50e1, 50c1, and 50d1, the fuel cell 40-1 is movable relative to the holder 32, and specifically, the position of the fuel cell 40-1 relative to the holder 32 may be changed in the Y1-Y2 direction from the position P1 shown in FIG. 4 to the position P2 shown in FIG. 5.

Similarly, the fuel cell 40-2 is attached on the bottom plate 33 of the holder 32. The guiding projections 33e2 are accommodated in the guiding grooves 50e2, the guiding projections 35c2 are accommodated in the guiding grooves 50c2, and the guiding projections 36d2 are accommodated in the guiding grooves 50d2. Therefore, within the widths of the grooves 50e2, 50c2, and 50d2, the fuel cell 40-2 is movable relative to the holder 32, and specifically, the position of the fuel cell 40-2 relative to the holder 32 may be changed in the Y1-Y2 direction from the position P11 shown in FIG. 4 to the position P12 shown in FIG. 5.

The positions of the fuel cells 40-1 and 40-2 are limited in the X1-X2 direction by the front plate 35 and the back plate 36, and in the Z1-Z2 direction by the guiding projections 35c1, 36d1, 35c2, and 36d2.

In the state shown in FIG. 4, the springy plate 57 is bent to be flat, and hence the fuel cells 40-1 and 40-2 are brought in close proximity to each other. However, because of the recovery force of the springy plate 57, the fuel cells 40-1 and 40-2 tend to separate from each other. As shown in FIG. 5, the fuel cell 40-1 can be moved in the Y1 direction up to position P2, where the guiding grooves 50e1, 50c1, and 50d1 are latched by the guiding projections 33e1, 35c1, and 36d1, respectively. Similarly, the fuel cell 40-2 can be moved in the Y2 direction up to positions P12, where the guiding grooves 50e2, 50c2, and 50d2 are latched by the guiding projections 33e2, 35c2, and 36d2, respectively.

In FIG. 2, and FIG. 4 and FIG. 5 as well, reference numbers 101 and 102 represent flexible tubes, which are made from silicon resin, for example. The flexible tubes 101 and 102 are located in the holder 32 for connecting the fuel feeding hole 34a in the holder 32 and the fuel feeding port 68-1 in the fuel cell 40-1, and the fuel feeding hole 34b in the holder 32 and the fuel feeding port 68-2 in the fuel cell 40-2. The tubes 101 and 102 are flexible and sufficiently long. For example, their lengths are longer than the distance from the fuel feeding hole 34a to the fuel feeding port 68-1. For this reason, the tubes 101 and 102 do not present obstacles to the above mentioned movement in the fuel cells 40-1 and 40-2. In FIG. 2, the reference number 103 represents a cap of the fuel feeding holes 34a and 34b.

Below, explanations are made of the mounting relation between the first hemi-case 70 and the second hemi-case 90 and the holder 32. As illustrated in FIG. 3A, the first hemi-case 70 and the second hemi-case 90 are movable from the position Q1 or Q11, where the first hemi-case 70 and the second hemi-case 90 are confronted with each other, to the position Q2 or Q12, where the first hemi-case 70 and the second hemi-case 90 are separated from each other.

When the first hemi-case 70 and the second hemi-case 90 are brought to be confronted with each other, as also shown in FIG. 4 and FIG. 6A, the first hemi-case 70 comes to enclose half of the holder 32 on the Y1 side, and the second hemi-case 90 comes to enclose half of the holder 32 on the Y2 side. As a result, the slits 35a and 36a, which are used for taking air in, are sealed by the first hemi-case 70 and the second hemi-case 90, and this prevents dust from entering the fuel cell device 30.

As shown in FIG. 6A, the latches 72b and 92b are fit into and are locked in the slit 35a, and the latches 73b and 93b are fit into and are locked in the slit 36a. If an operator of the fuel cell device 30 holds the first hemi-case 70 and the second hemi-case 90 and pulls them apart in the Y1-Y2 direction to separate them from each other, the latches 72b, 92b and 73b, 93b are drawn from the slits 35a and 36a, respectively, and the first hemi-case 70 is moved to the position Q2 in the Y1 direction, and the second hemi-case 90 is moved to the position Q12 in the Y2 direction. As a result, the latches 72b and 73b of the first hemi-case 70 are blocked by the stopper projections 35b1 and 36b1 of the holder 32, and thus the first hemi-case 70 is latched in the openings 35d1 and 36d1. Similarly, the latches 92b and 93b of the second hemi-case 90 are blocked by the stopper projections 35b2 and 36b2 of the holder 32, and the second hemi-case 90 is latched in the openings 35d2 and 36d2. In this way, the first hemi-case 70 and the second hemi-case 90 are shifted and are locked, as illustrated, for example, in FIG. 6.

Next, explanations are made of the operations of the fuel cell device 30 having the above configuration.

Figure 1:
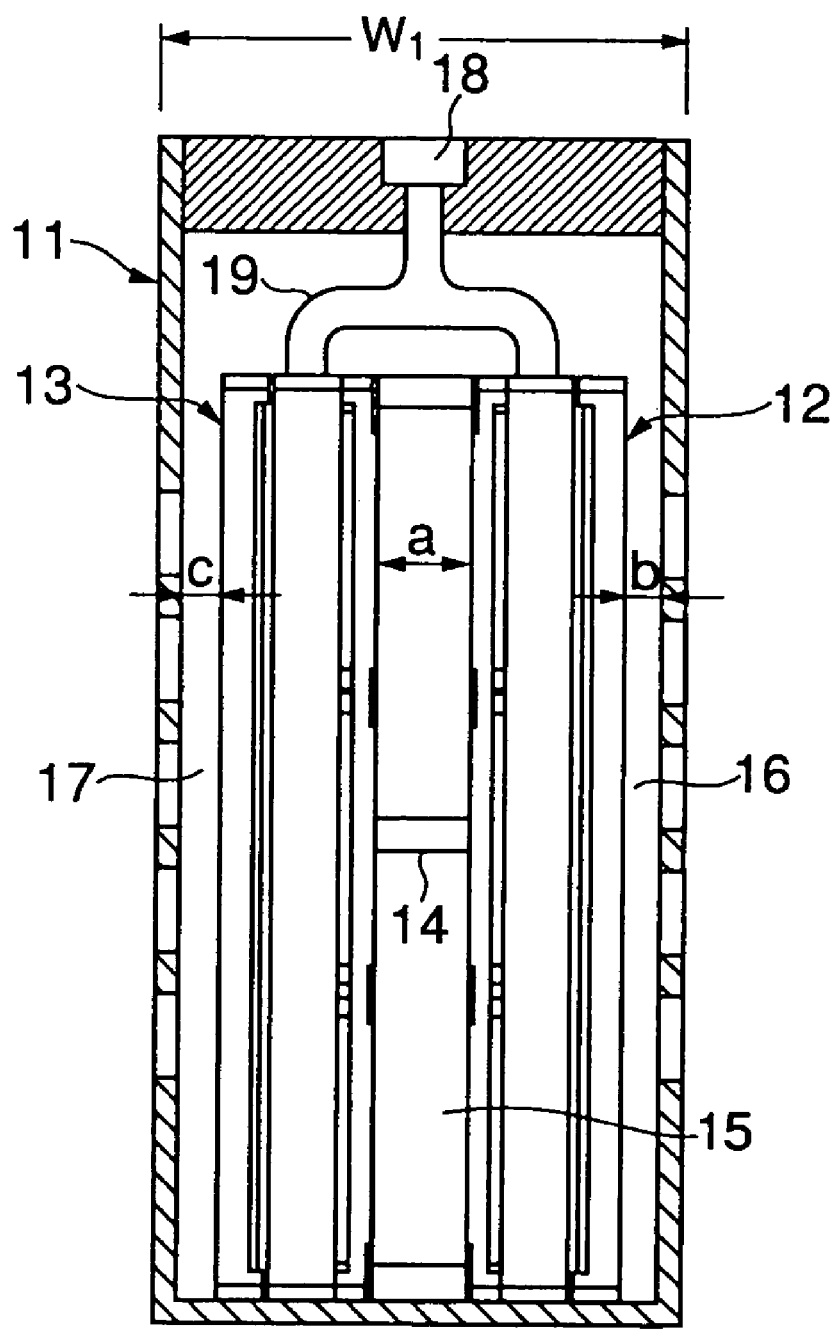
FIG. 1 is a sectional view of a fuel cell device of the related art.

During transportation or in storage, for example, the fuel cell device 30 is in the state illustrated in FIG. 3A, FIG. 4, and FIG. 6A. The first hemi-case 70 and the second hemi-case 90 are brought to be confronted with each other and are locked at positions Q1 and Q11, and thereby the springy plate 57 is bent into a relatively more flat condition and hence the fuel cells 40-1 and 40-2 are brought close to each other. The fuel cell device 30 has a width of W3, which is shorter than the width W1 of the fuel cell device 10 shown in FIG. 1, and therefore the fuel cell device 30 is compact, and can be more easily and conveniently transported or stored.

Further, due to the recovery force of the springy plate 57, the fuel cells 40-1 and 40-2 are pressed by the grid plates 71 and 91 of the respective first hemi-case 70 and the second hemi-case 90, and the case 31 holds the fuel cells 40-1 and 40-2 therein so as to resist or prevent rattling.

The air holes 56a and 66a of the air housings 56 and 66 in the peripheries of the fuel cells 40-1 and 40-2 are covered by the grid plates 71 and 91 of the first hemi-case 70 and the second hemi-case 90, and this prevents dust from entering the fuel cell device 30.

In an exemplary embodiment, considering the fuel cell device 30 is used to generate electrical power to charge the battery of a cellular phone in case of a disaster or other emergency, an operator holds the first hemi-case 70 and the second hemi-case 90 and pulls them apart to separate them from each other. In doing so, the first hemi-case 70 and the second hemi-case 90 are moved to the positions Q2 and Q12, respectively, which are separated at a certain distance. As illustrated in FIG. 3B, FIG. 5 and FIG. 6B, the case 31 is thereby extended to a width of W4 in the Y1-Y2 direction in which the fuel cells 40-1 and 40-2 are arranged. The fuel cells 40-1 and 40-2 are relieved from the pressing force from the first hemi-case 70 and the second hemi-case 90, and are moved by the springy plate 57 to separate from each other to the positions P2 and P12. As a result, the fuel cells 40-1 and 40-2 are separated, and their interval is enlarged to a1, and this leaves a space 115 between the fuel cells 40-1 and 40-2. Similarly, there arises a space 116 having a width of b1 between the fuel cell 40-1 and the grid plate 71, and a space 117 having a width of c1 between the fuel cell 40-2 and the grid plate 91.

In addition, when the first hemi-case 70 and the second hemi-case 90 are separated from each other, the slits 35a and 36a are exposed, and the space 115 turns to be communicating with the outside of the holder 32 on both of the X1 side and the X2 side through the slits 35a and 36a. Further, when the first hemi-case 70 and the second hemi-case 90 are separated from each other, the spaces 116 and 117 are communicating with the outside through the square holes 76 and 96, and the cap 103 is exposed.

In this state, a fuel cartridge, as described below, may be used to feed methanol liquid into the fuel cells 40-1 and 40-2. Consequently, the fuel cells 40-1 and 40-2 start to generate electric power by utilizing the methanol together with air entering the space 115 through the slits 35a and 36a and air entering the spaces 116 and 117 through the square holes 76 and 96. The $CO_2$ gas generated in the fuel housing 50 is exhausted via the gas filter 69.

After the power generation is finished, the operator pushes the first hemi-case 70 and the second hemi-case 90 to bring them to approach each other. As a result, the first hemi-case 70 and the second hemi-case 90 are moved to the positions Q1 and Q11 and are confronted with each other, and the size of the case 31 become small; more particularly, the width of the case 31 become W3, as shown in FIG. 3A, and this facilitates transportation and storage of the fuel cell device 30.

It will be appreciated by those skilled in the art that means other than the springy plate 57 may be used to extend the interval between the fuel cells 40-1 and 40-2.

Below, an exemplary fuel cartridge 150 used to feed a liquid fuel to the fuel cell device 30 is explained while making reference to FIGS. 9A and 9B.

Figure 9:
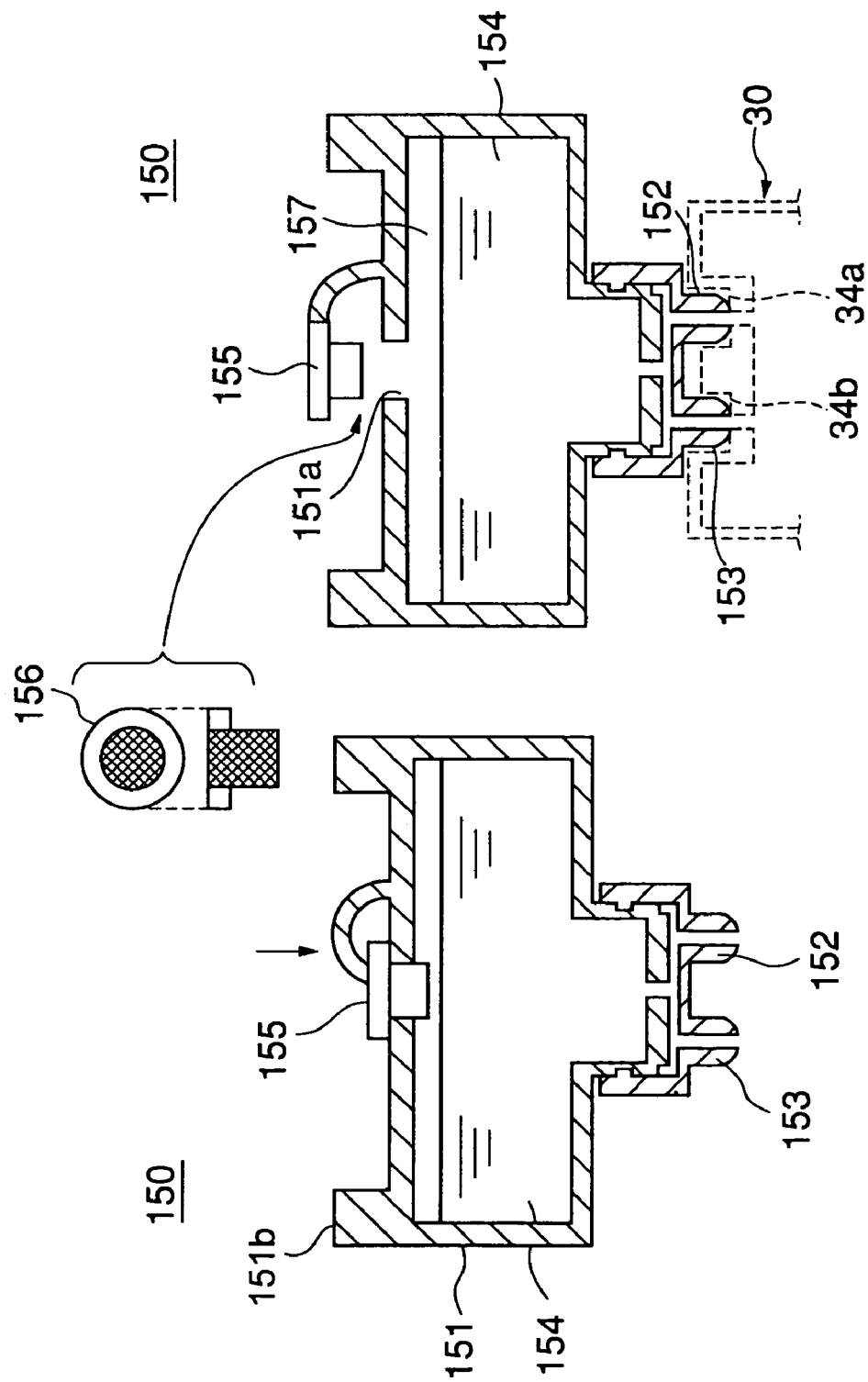
FIGS. 9A and 9B are views of a fuel cartridge.

FIGS. 9A and 9B are views of the fuel cartridge 150.

The fuel cartridge 150 includes a tank 151, and nozzles 152 and 153 at the bottom of the tank 151. In the tank 151, there is stored an amount of methanol liquid 154, whose volume corresponds to, for example, the volumes of the fuel cell 40-1 and 40-2. On the top side of the tank 151, there is an opening 151a at the center for ventilation, and a rib 151b at the periphery. The cap 155 is provided to plug the opening 151a.

The fuel cartridge 150 can be attached to the fuel cell device 30, for example, in the following way. First, the cap 103 on the holder 32 (refer to FIG. 2) of the fuel cell device 30 is drawn out, and the nozzles 152 and 153 of the fuel cartridge 150 are inserted into the fuel feeding holes 34a and 34b of the fuel cell device 30, thus the fuel cartridge 150 is attached to the top of the fuel cell device 30. Then, the cap 155 of the fuel cartridge 150 is drawn out, and the space 157 above the methanol liquid 154 in the tank 151 is communicating with air, and the methanol liquid 154 flows through the nozzles 152 and 153 into the fuel cells 40-1 and 40-2 by means of its weight, for example.

In the illustrated exemplary embodiment, the methanol liquid 154 is filled into the fuel cells 40-1 and 40-2 without any special apparatuses for imposing pressure; that is, filling of the methanol liquid 154 is done by just inserting the nozzles 152 and 153 of the fuel cartridge 150 into the fuel feeding holes 34a and 34b of the fuel cell device 30 to attach the fuel cartridge 150 to the fuel cell device 30, and then removing the cap 155. This is quite simple, stable and safe.

After the methanol liquid 154 is filled into the fuel cells 40-1 and 40-2, the fuel cell device 30 may be plugged with the cap 103. It should be noted that after the cap 155 of the fuel cartridge 150 is drawn out, and in the course of filling the methanol liquid 154 into the fuel cells 40-1 and 40-2, the ventilation opening 151a may also be closed with a separate cap 156 (not illustrated) having a filter that allows gas, for example, air, but not liquid to passes through. In this way, even if the fuel cell device 30 topples over in the course of filling the methanol liquid 154 into the fuel cells 40-1 and 40-2, the methanol liquid 154 does not leak to the outside. Further, the $CO_2$ gas generated during electrical power generation may still be partially exhausted to the outside through the empty tank 151 and the cap 156.

Figure 10:
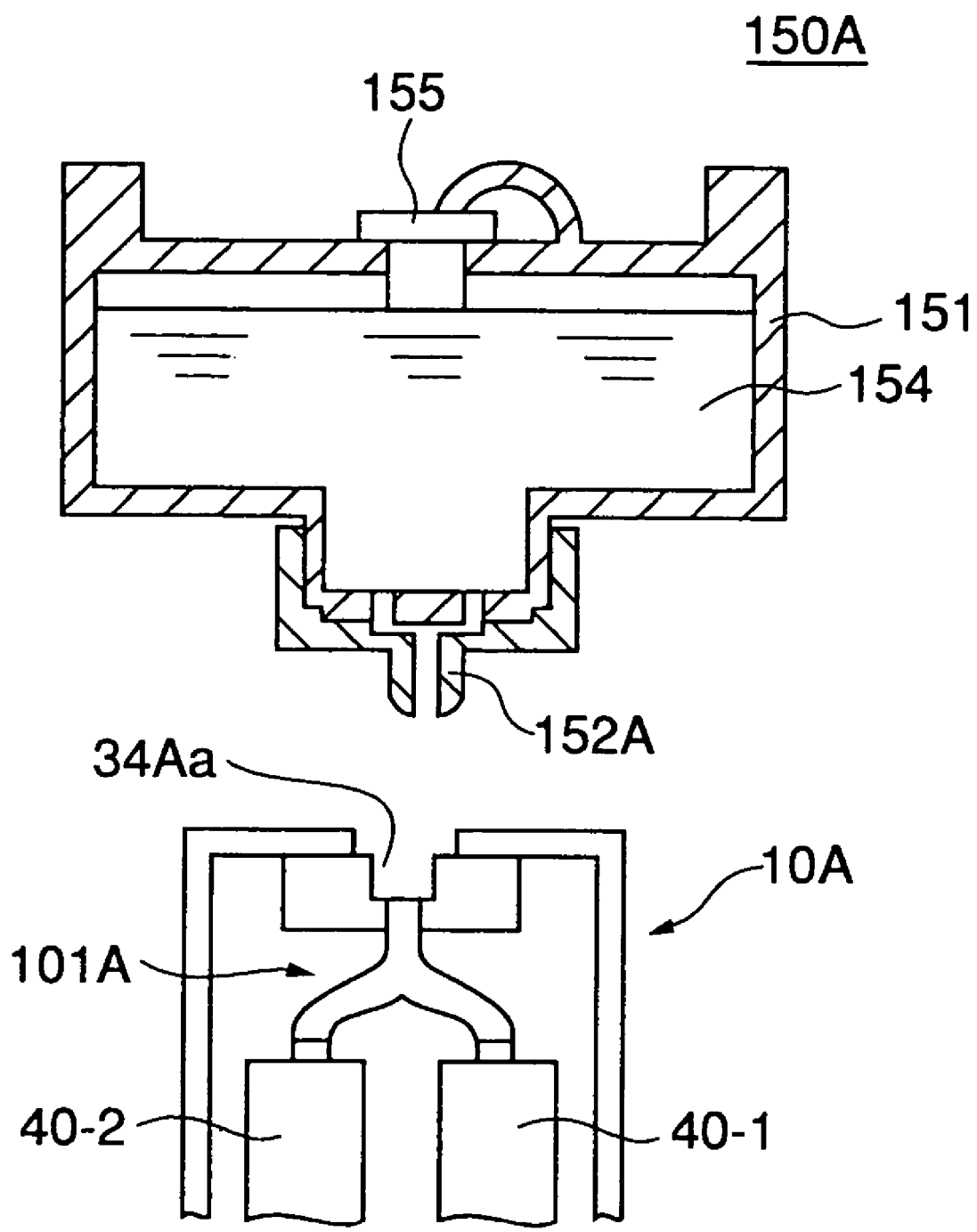
FIG. 10 is a view of another fuel cartridge.

FIG. 10 is a view of a fuel cartridge 150A, as another embodiment of a fuel cartridge according to the present invention.

As shown in FIG. 10, the fuel cartridge 150A has one nozzle 152A. Such a fuel cartridge is applicable to, for example, a fuel cell device 10A having a single fuel feeding hole 34aA, which is provided with a reverse Y-shaped flexible pipe 101A, as illustrated in FIG. 10. As the fuel cartridge 150A has only one nozzle 152A, there is only one place for insertion, and this makes the operation of attaching the fuel cartridge 150A to the fuel cell device 10A easier than, for example, to the fuel cell device 30, which has multiple nozzles.

Second Embodiment

FIGS. 11A, 11B and 11C are views of a fuel cell device 30A according to a second embodiment of the present invention, where FIG. 11A shows a state of the fuel cell device 30A when it is not in use, that is, the fuel cell device 30A is being transported or in storage. FIG. 11B shows the fuel cell device 30A being used in electrical power generation. FIG. 11C shows a detailed structure of the fuel cell device 30A.

As illustrated in FIG. 11A, in the fuel cell device 30A, a fuel cell unit 200 is accommodated in a case 210 provided with a lid 211. The lid 211 covers the top opening of the case 210. The fuel cell unit 200 has three fuel cells 40-1, 40-2, and 40-3 with compressed springs 220 set between two neighboring cells. A fuel feeding tube 221 is connected with the fuel cells 40-1, 40-2, and 40-3. The fuel feeding tube 221 has a conduit 222, and is branched into three tubes 223, 224 and 225. The tubes 223, 224 and 225 are made of silicon resin, for example, are flexible and sufficiently long, for example, longer than the distance between the conduit 222 and any of the fuel feeding ports 68A-1, 68A-2, and 68A-3 of the fuel cells 40-1, 40-2, and 40-3, respectively. The ends of the tubes 223, 224 and 225 are connected to the fuel feeding ports 68A-1, 68A-2, and 68A-3 of the fuel cells 40-1, 40-2, and 40-3, respectively.

Each of the fuel cells 40-1, 40-2, and 40-3 has an opening at the bottom, and these openings are plugged with plugs 226. The case 210 is compact, having a width W10 corresponding to, for example, the total thickness of the three fuel cells 40-1, 40-2, and 40-3.

When generating electrical power, as illustrated in FIG. 11B, the fuel cell unit 200 is taken out from the case 210, and placed on a table 230 on a stand 250 to prevent the fuel cell unit 200 from toppling over. The fuel cartridge 150A is then attached to the fuel cell unit 200.

Once the fuel cell unit 200 is taken out from the case 210, as illustrated in FIG. 11B, the fuel cell unit 200 expands. Specifically, once the fuel cell unit 200 is taken out from the case 210, the constraint imposed by the case 210 is relieved, the compressed springs 220 between the neighboring fuel cells among the fuel cells 40-1, 40-2, and 40-3 expand, and the intervals between the fuel cells 40-1, 40-2, and 40-3 are enlarged, forming space 240 and 241 between the fuel cells 40-1 and 40-2, and 40-2 and 40-3. Since the tubes 223, 224 and 225 are flexible and sufficiently long, they do not present obstacles to the expansion of the intervals between the fuel cells 40-1, 40-2, and 40-3.

The stand 250 is reverse-U-shaped, and is larger than the expanded fuel cell unit 200A. The stand 250 has telescopic legs, and the legs may be extended appropriately so as to cover the expanded fuel cell unit 200A, therefore preventing toppling over of the expanded fuel cell unit 200A. Between the fuel cell 40-1 and the stand 250, and the fuel cell 40-3 and the stand 250, there also exist spaces 242 and 243, respectively.

After the fuel cartridge 150A is attached to the stand 250, and nozzle 152A of the fuel cartridge 150A and the conduit 222 of the fuel feeding tube 221 are connected. As illustrated in the enlarged view in FIG. 11B, there is a sealing rubber 152Aa at the periphery of the nozzle 152A, whereby the conduit 222 is tightly connected to the nozzle 152A. When the cap 155 is pulled out, the methanol liquid 154 flows through the nozzle 152A, and is filled into the fuel cells 40-1, 40-2, and 40-3 via the fuel feeding tubes 223, 224 and 225. Then, the fuel cells 40-1, 40-2, and 40-3 start to generate electrical power. After the methanol liquid 154 has been filled into the fuel cells 40-1, 40-2, and 40-3, the cap 150 is plugged into the top opening.

The conduit 222 of the fuel feeding tube 221 and the nozzle 152A of the fuel cartridge 150A may also be connected by, for example, screwing them together, as illustrated in FIG. 11C.

In FIG. 11C, the conduit of the fuel feeding tube 221 is represented by 222A, and the nozzle of the fuel cartridge 150A is represented by 152B. As shown in FIG. 11C, there are screws 222Aa on the inner surface the conduit 222A, and screws 152Ba on the outer surface the nozzle 152B, and therefore, the nozzle 152B may be connected with the conduit 222A by screwing the nozzle 152B into the conduit 222A.

Figure 12:
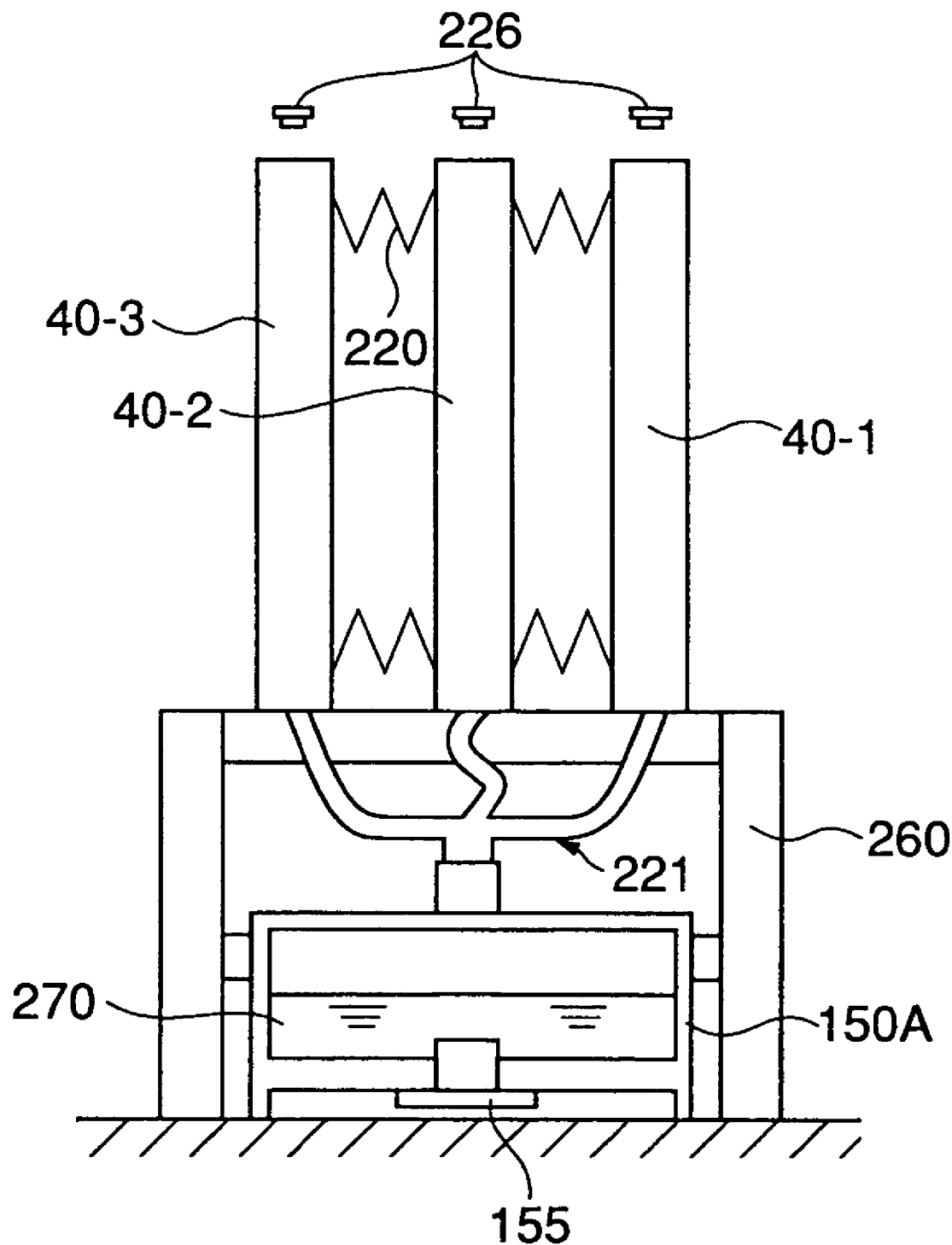
FIG. 12 is a view of the fuel cell device shown in FIG. 11, showing the operation of exhausting used fuel.

FIG. 12 is a view of the fuel cell device 30A shown in FIG. 11, showing the operation of exhausting the used fuel from the fuel cell device 30A, and collecting the used fuel back into the fuel cartridge 150A after electrical power generation.

In FIG. 12, another topple-resistant stand 260 is placed on the table 230, and the expanded fuel cell unit 200A is set on the stand 260. The empty fuel cartridge 150A connected with the fuel feeding tube 221 extends into the stand 260, and the plugs 226 on the bottoms of the fuel cells 40-1, 40-2, and 40-3 (they are at the top in FIG. 12) are drawn out. Consequently, the used fuel 270 in the fuel cells 40-1, 40-2, and 40-3 is exhausted through the fuel feeding tube 221, and is collected into the empty fuel cartridge 150A.

Figure 13:
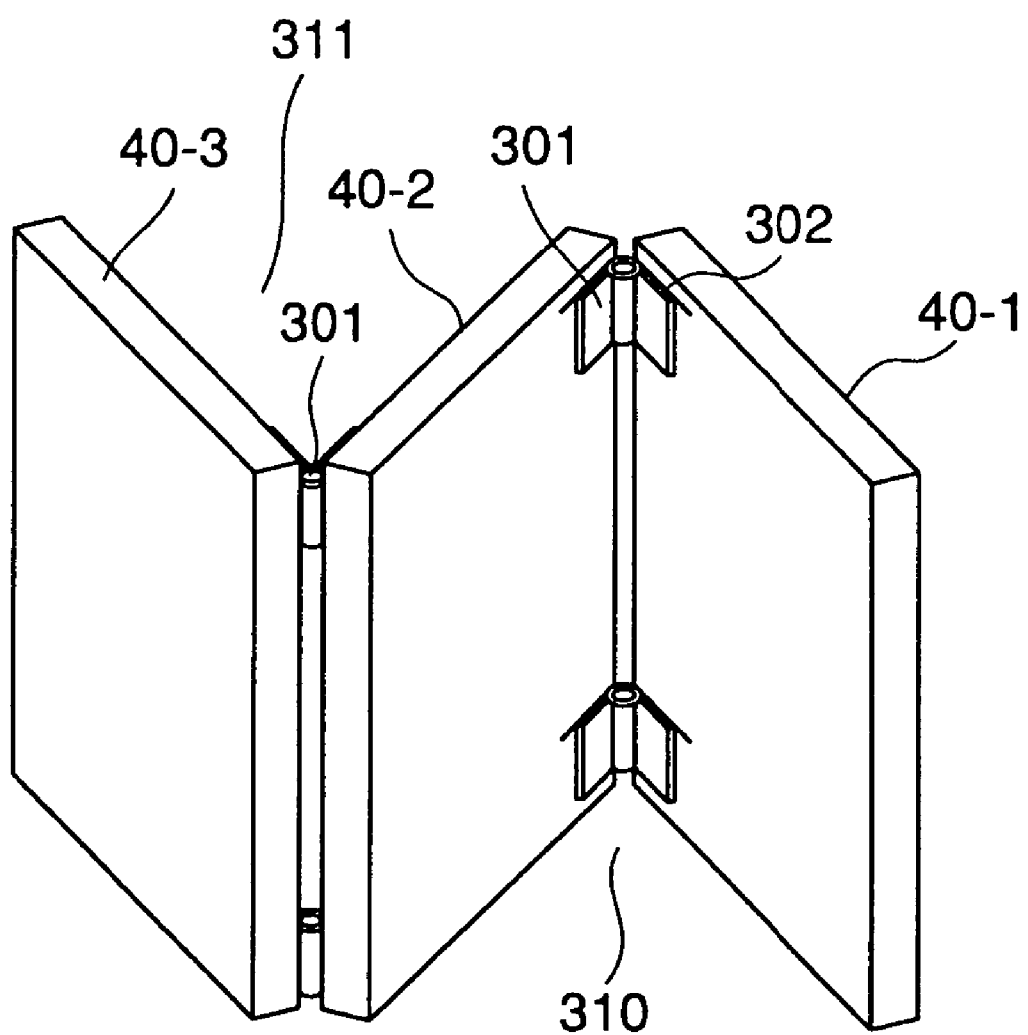
FIG. 13 is a perspective view of a fuel cell unit according to the second embodiment.
Figure 14:
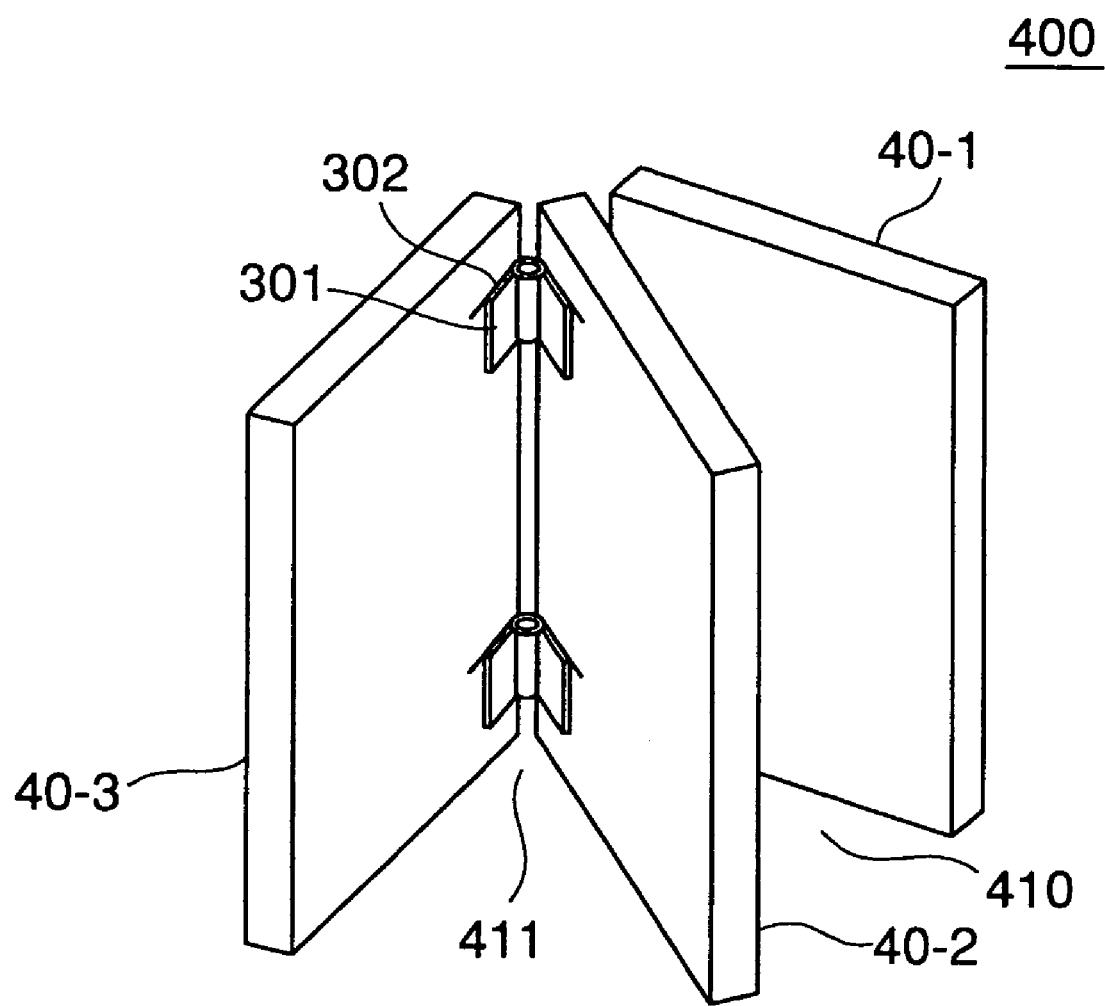
FIG. 14 is a perspective view of another fuel cell unit according to the second embodiment.

FIG. 13 and FIG. 14 are perspective views of other examples of fuel cell units according to the present invention. FIG. 13 and FIG. 14 show fuel cell units 300 and 400, respectively, each of which includes plate-like fuel cells 40-1, 40-2, and 40-3 joined via hinges 301. Each of the hinges 301 has a springy member 302 that tends to keep the fuel cell 40-1, or the fuel cell 40-2, or the fuel cell 40-3 open.

In the fuel cell unit 300 shown in FIG. 13, the fuel cells 40-1, 40-2, and 40-3 are swingable relative to each other and expandable in a zigzag manner to form spaces 310 and 311 between them. As illustrated in FIG. 13, each two adjacent fuel cells (the fuel cells 40-1 and 40-2, or 40-2 and 40-3) are joined by the hinges 301, and this makes the fuel cell unit 300 a firm structure notwithstanding its zigzag configuration.

In the fuel cell unit 400 shown in FIG. 14, the fuel cells 40-1, 40-2, and 40-3 are swingably joined and expand like a fan, forming spaces 410 and 411 between them. Similarly, since each two adjacent fuel cells (the fuel cells 40-1 and 40-2, or 40-2 and 40-3) are joined by the hinges 301, the fuel cell unit 400 is a firm structure notwithstanding its fan-like expanding ability. When the fuel cell units 300 and 400 are not in use, the fuel cells 40-1, 40-2, and 40-3 are folded and superposed, making the fuel cell units 300 and 400 become quite compact, and therefore, the fuel cell units 300 and 400 can be easily accommodated into the case.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, according to the present invention, the width of the case may be expanded or contracted, and the interval between two adjacent fuel cells may be accordingly enlarged or reduced. Therefore, when a fuel cell device is being transported or is in storage, for example, the adjacent fuel cells may be brought in close proximity to each other by reducing the size of the case, and this makes the fuel cell device compact. Meanwhile, when electrical power generation is to be performed, the interval between two adjacent fuel cells may be increased by enlarging the size of the case, and resultantly a sufficient amount of air can be supplied to the fuel cells, and this enables efficient power generation.

In addition, because the interval between two adjacent fuel cells may be enlarged or reduced by changing the width of the case, it is sufficient to just change the size of the case in order to change the interval between fuel cells, and it is not necessary to operate the fuel cells themselves directly, so the operation is very simple.

Further, because the case is formed from a holder and two hemi-cases movably attached to two opposite sides of the holder, the case is a stable structure and the size of the case is changeable. Because the fuel cells are accommodated inside the holder, even when the interval between fuel cells is enlarged, the fuel cells are stably held by the holder. Because two adjacent fuel cells can be separated by a springy member between neighboring fuel cells, it is possible to realize, by a very simple structure, that the interval between neighboring fuel cells is changed in conjunction with compression and expansion of the springy member.

When the interval between two adjacent fuel cells is increased by enlarging the size of the case, spaces are formed between two adjacent fuel cells and between a fuel cell and the case, and a sufficient amount of air is supplied to the fuel cells, and this enables efficient power generation.

In addition, the opening in the holder and the openings in the hemi-cases can be sealed by the first hemi-case and the second hemi-case when the first hemi-case and the second hemi-case are moved to be confronted with each other. Therefore it is possible to prevent dust from entering the fuel cell device. On the other hand, the opening in the holder and the openings in the hemi-cases can be exposed when the first hemi-case and the second hemi-case are moved to separate from each other, as a result, a sufficient amount of air from the outside of the case can be supplied to the fuel cells, and this enables efficient power generation.

In addition, a flexible tube may be used to connect the fuel cells and the fuel feeding port on the holder. Because the tube is sufficiently long, flexible and can be freely bent, the fuel cells have no difficulties in moving away from each other, and thus the interval between adjacent two fuel cells can be surely enlarged. Furthermore, because the fuel feeding port is formed on the holder and is not movable, it facilitates usage of a fuel cartridge for feeding a fuel through the fuel feeding port.

Further, because the interval between two adjacent fuel cells is enlarged when the fuel cell unit is taken out of the case, it is sufficient to just take the fuel cell unit out of the case in order to increase the interval between fuel cells, and it is not necessary to operate the fuel cells themselves directly, so the operation is very simple.

In addition, because the adjacent fuel cells are joined by a hinge, the structure of the fuel cell unit is stable even though the interval between neighboring fuel cells is enlarged.

Further, according to the fuel cartridge of the present invention, feeding a liquid fuel into fuel cells in a fuel cell device can be surely performed by just inserting the nozzles into the fuel cell device and removing the cap of the fuel cartridge.

This patent application is based on Japanese priority patent application No. 2003-045969 filed on Feb. 24, 2003, the entire contents of which are hereby incorporated by reference.

What is claimed is:

1. A fuel cell device, comprising:
   a case including:
      a holder frame;
      a first hemi-case movably attached to a first open side of the holder frame; and
      a second hemi-case movably attached to a second open side of the holder frame opposite to the first side, the first hemi-case and the second hemi-case being movable in an approaching direction in which the first hemi-case and the second hemi-case approach up to a close position, and a separating direction in which the first hemi-case and the second hemi-case separate in open positions;
   a fuel cell unit in the case, including a plurality of fuel cells movably arranged inside the holder frame; and
   a springy member that exerts a force between two adjacent cells to increase a distance therebetween;
   wherein
   when the first hemi-case and the second hemi-case are moved in the separating direction, the two adjacent fuel cells are moved by the springy member, thereby increasing the distance between adjacent two of the fuel cells.

2. The fuel cell device as claimed in claim 1, wherein the holder frame has a first opening that allows air from outside the case to flow between the two adjacent fuel cells when the first hemi-case and the second hemi-case are in an open position;
   each of the first hemi-case and the second hemi-case has a second opening that makes a space between the case and the fuel cell unit to communicate outside the case; and
   the first opening and the second opening are sealed by the first hemi-case and the second hemi-case in the closed position, and are exposed when the first hemi-case and the second hemi-case are moved to separate from each other in an open position.

3. The fuel cell device as claimed in claim 1, wherein the holder frame includes a fuel feeding port; and
   the fuel cell unit includes a flexible tube for connecting the fuel cells and the fuel feeding port.

4. A fuel cell case for accommodating a plurality of fuel cells, comprising:
   a holder frame;
   a first hemi-case movably attached to a first open side of the holder frame; and
   a second hemi-case movably attached to a second open side of the holder frame opposite to the first side, the first hemi-case and the second hemi-case being movable in an approaching direction in which the first hemi-case and the second hemi-case approach up to a close position, and a separating direction in which the first hemi-case and the second hemi-case separate in open positions;
   wherein
   when the first hemi-case and the second hemi-case are moved in the separating direction, an interval between adjacent two of the fuel cells is increased.

5. The fuel cell device as claimed in claim 4, wherein the holder frame has a first opening that allows air from outside the case to flow between the adjacent two of the fuel cells when the first hemi-case and the second hemi-case are in an open position;
   each of the first hemi-case and the second hemi-case has a second opening that makes a space between the case and a fuel cell adjacent to the case to communicate to outside the case; and
   the first opening and the second opening are sealed by the first hemi-case and the second hemi-case when the first hemi-case and the second hemi-case are moved to the close position, and are exposed when the first hemi-case and the second hemi-case are moved to separate from each other in an open position.

* * * * *

UNITED STATES PATENT AND TRADEMARK OFFICE
CERTIFICATE OF CORRECTION

PATENT NO. : 7,416,805 B2
APPLICATION NO. : 10/677353
DATED : August 26, 2008
INVENTOR(S) : Akio Nakamura et al.

It is certified that error appears in the above-identified patent and that said Letters Patent is hereby corrected as shown below:

Column 13, Line 45, after "adjacent" insert --fuel--.

Signed and Sealed this

Thirteenth Day of January, 2009

JON W. DUDAS
*Director of the United States Patent and Trademark Office*